(12) United States Patent
Tung et al.

(10) Patent No.: US 7,719,747 B2
(45) Date of Patent: May 18, 2010

(54) METHOD AND POST STRUCTURES FOR INTERFEROMETRIC MODULATION

(75) Inventors: Ming-Hau Tung, San Francisco, CA (US); Srinivasan Sethuraman, San Francisco, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 0 days.

(21) Appl. No.: 12/036,958

(22) Filed: Feb. 25, 2008

(65) Prior Publication Data

US 2008/0180777 A1 Jul. 31, 2008

Related U.S. Application Data

(63) Continuation of application No. 11/052,004, filed on Feb. 4, 2005, now Pat. No. 7,349,141.

(60) Provisional application No. 60/613,471, filed on Sep. 27, 2004.

(51) Int. Cl.
*G02F 1/03* (2006.01)
*G02B 26/00* (2006.01)
*G09G 3/34* (2006.01)
(52) U.S. Cl. .............. 359/260; 359/290; 359/245; 359/224.1; 345/85; 345/108
(58) Field of Classification Search ............. 359/214, 359/260, 290, 291, 295, 292, 298, 224, 245, 359/247, 248, 237, 238, 365; 438/48, 222, 438/478; 385/129, 147; 356/445, 477, 503, 356/504; 216/13, 17; 345/85; 257/416; 427/123
See application file for complete search history.

(56) References Cited

U.S. PATENT DOCUMENTS

| 3,439,973 A | 4/1969 | Paul et al. |
| 3,886,310 A | 5/1975 | Guldberg et al. |
| 3,924,929 A | 12/1975 | Holmen |

(Continued)

FOREIGN PATENT DOCUMENTS

CN 1158182 8/1997

(Continued)

OTHER PUBLICATIONS

Conner, "Hybrid Color Display Using Optical Interference Filter Array," SID Digest, pp. 577-580 (1993).

(Continued)

*Primary Examiner*—Loha Ben
(74) *Attorney, Agent, or Firm*—Knobbe, Martens, Olson & Bear, LLP

(57) ABSTRACT

An interferometric modulator includes a post structure comprising an optical element. In a preferred embodiment, the optical element in the post structure is a reflective element, e.g., a mirror. In another embodiment, the optical element in the post structure is an etalon, e.g., a dark etalon. The optical element in the post structure may decrease the amount of light that would otherwise be retroreflected from the post structure. In various embodiments, the optical element in the post structure increases the brightness of the interferometric modulator by redirecting light into the interferometric cavity. For example, in certain embodiments, the optical element in the post structure increases the backlighting of the interferometric modulator.

45 Claims, 9 Drawing Sheets

U.S. PATENT DOCUMENTS

| | | |
|---|---|---|
| 4,287,449 A | 9/1981 | Takeda et al. |
| 4,421,381 A | 12/1983 | Ueda et al. |
| 4,441,791 A | 4/1984 | Horbeck |
| 5,142,414 A | 8/1992 | Koehler |
| 5,164,858 A | 11/1992 | Aguilera, Jr. et al. |
| 5,291,314 A | 3/1994 | Agranat |
| 5,326,426 A | 7/1994 | Tam et al. |
| 5,474,865 A | 12/1995 | Vasudev |
| 5,550,373 A | 8/1996 | Cole et al. |
| 5,579,149 A | 11/1996 | Moret et al. |
| 5,606,441 A | 2/1997 | Florence et al. |
| 5,638,084 A | 6/1997 | Kalt |
| 5,671,994 A | 9/1997 | Tai |
| 5,673,128 A | 9/1997 | Ohta et al. |
| 5,754,260 A | 5/1998 | Ooi |
| 5,815,229 A | 9/1998 | Shapiro et al. |
| 5,835,255 A | 11/1998 | Miles |
| 5,883,684 A | 3/1999 | Millikan |
| 5,886,688 A | 3/1999 | Fifield |
| 5,913,594 A | 6/1999 | Iimura |
| 5,914,804 A | 6/1999 | Goossen et al. |
| 5,920,417 A | 7/1999 | Johnson |
| 5,933,183 A | 8/1999 | Enomoto |
| 5,986,796 A | 11/1999 | Miles |
| 5,991,073 A | 11/1999 | Woodgate |
| 6,040,937 A | 3/2000 | Miles |
| 6,049,317 A | 4/2000 | Thompson et al. |
| 6,055,090 A | 4/2000 | Miles |
| 6,195,196 B1 | 2/2001 | Kimura et al. |
| 6,199,989 B1 | 3/2001 | Maeda |
| 6,273,577 B1 | 8/2001 | Goto |
| 6,282,010 B1 | 8/2001 | Sulzbach et al. |
| 6,285,424 B1 | 9/2001 | Yoshida |
| 6,288,824 B1 | 9/2001 | Kastalsky |
| 6,292,504 B1 | 9/2001 | Halmos |
| 6,323,923 B1 | 11/2001 | Hoshino |
| 6,342,970 B1 | 1/2002 | Sperger et al. |
| 6,356,378 B1 | 3/2002 | Huibers |
| 6,377,233 B2 | 4/2002 | Colgan et al. |
| 6,381,022 B1 | 4/2002 | Zavracky et al. |
| 6,448,709 B1 | 9/2002 | Chuang et al. |
| 6,456,279 B1 | 9/2002 | Kubo |
| 6,466,354 B1 | 10/2002 | Gudeman |
| 6,518,944 B1 | 2/2003 | Doane |
| 6,519,073 B1 | 2/2003 | Goossen |
| 6,574,033 B1 | 6/2003 | Chui |
| 6,597,490 B2 | 7/2003 | Tayebati |
| 6,630,786 B2 | 10/2003 | Cummings et al. |
| 6,636,322 B1 | 10/2003 | Terashita |
| 6,642,913 B1 | 11/2003 | Kimura |
| 6,650,455 B2 | 11/2003 | Miles |
| 6,674,562 B1 | 1/2004 | Miles |
| 6,680,792 B2 | 1/2004 | Miles |
| 6,683,693 B1 | 1/2004 | O Tsuka et al. |
| 6,741,377 B2 | 5/2004 | Miles |
| 6,742,907 B2 | 6/2004 | Funamoto et al. |
| 6,792,293 B1 | 9/2004 | Awan |
| 6,794,119 B2 | 9/2004 | Miles |
| 6,829,258 B1 | 12/2004 | Carlisle et al. |
| 6,841,787 B2 | 1/2005 | Almogy |
| 6,844,953 B2 | 1/2005 | Reboa |
| 6,844,959 B2 | 1/2005 | Huibers |
| 6,853,418 B2 | 2/2005 | Suzuki |
| 6,879,354 B1 | 4/2005 | Sawayama |
| 6,880,959 B2 | 4/2005 | Houston |
| 6,882,461 B1 * | 4/2005 | Tsai et al. .................. 359/290 |
| 6,897,855 B1 | 5/2005 | Matthies |
| 6,912,022 B2 | 6/2005 | Lin |
| 6,930,816 B2 | 8/2005 | Mochizuki |
| 6,967,779 B2 | 11/2005 | Fadel |
| 7,002,726 B2 | 2/2006 | Patel |
| 7,009,754 B2 | 3/2006 | Huibers |
| 7,042,643 B2 | 5/2006 | Miles |
| 7,072,093 B2 | 7/2006 | Piehl et al. |
| 7,113,339 B2 | 9/2006 | Taguchi |
| 7,123,216 B1 | 10/2006 | Miles |
| 7,126,738 B2 | 10/2006 | Miles |
| 7,138,984 B1 | 11/2006 | Miles |
| 7,142,347 B2 | 11/2006 | Islam |
| 7,161,730 B2 | 1/2007 | Floyd et al. |
| 7,187,489 B2 | 3/2007 | Miles |
| 7,218,429 B2 | 5/2007 | Batchko |
| 7,342,705 B2 | 3/2008 | Chui |
| 7,349,139 B2 | 3/2008 | Chui |
| 7,349,141 B2 | 3/2008 | Tung |
| 7,355,780 B2 | 4/2008 | Chui |
| 7,389,476 B2 | 6/2008 | Senda |
| 7,561,323 B2 | 7/2009 | Gally |
| 2001/0010630 A1 | 8/2001 | Umemoto |
| 2001/0019479 A1 | 9/2001 | Nakabayashi et al. |
| 2001/0022636 A1 | 9/2001 | Yang |
| 2001/0049061 A1 | 12/2001 | Nakagaki et al. |
| 2001/0055208 A1 | 12/2001 | Kimura |
| 2002/0006036 A1 | 1/2002 | Egawa |
| 2002/0024711 A1 | 2/2002 | Miles |
| 2002/0044445 A1 | 4/2002 | Bohler |
| 2002/0054424 A1 | 5/2002 | Miles |
| 2002/0075555 A1 | 6/2002 | Miles |
| 2002/0080465 A1 | 6/2002 | Han |
| 2002/0106182 A1 | 8/2002 | Kawashima |
| 2002/0126364 A1 | 9/2002 | Miles |
| 2002/0149584 A1 | 10/2002 | Simpson |
| 2002/0167730 A1 | 11/2002 | Needham et al. |
| 2003/0012009 A1 | 1/2003 | Suzuki |
| 2003/0016930 A1 | 1/2003 | Inditsky |
| 2003/0043157 A1 | 3/2003 | Miles |
| 2003/0095401 A1 | 5/2003 | Hanson |
| 2003/0098957 A1 | 5/2003 | Haldiman |
| 2003/0103344 A1 | 6/2003 | Niida |
| 2003/0107692 A1 | 6/2003 | Sekiguchi |
| 2003/0151821 A1 | 8/2003 | Favalora et al. |
| 2003/0160919 A1 | 8/2003 | Suzuki et al. |
| 2003/0161040 A1 | 8/2003 | Ishii |
| 2003/0169385 A1 | 9/2003 | Okuwaki |
| 2003/0193630 A1 | 10/2003 | Chiou |
| 2003/0210222 A1 | 11/2003 | Ogiwara et al. |
| 2003/0210363 A1 | 11/2003 | Yasukawa et al. |
| 2003/0210367 A1 | 11/2003 | Nakano |
| 2004/0001169 A1 | 1/2004 | Saiki |
| 2004/0017599 A1 | 1/2004 | Yang |
| 2004/0027315 A1 | 2/2004 | Senda et al. |
| 2004/0027636 A1 | 2/2004 | Miles |
| 2004/0051929 A1 | 3/2004 | Sampsell et al. |
| 2004/0066477 A1 | 4/2004 | Morimoto et al. |
| 2004/0070711 A1 | 4/2004 | Wen et al. |
| 2004/0080807 A1 | 4/2004 | Chen et al. |
| 2004/0080938 A1 | 4/2004 | Holman et al. |
| 2004/0085748 A1 | 5/2004 | Sugiura |
| 2004/0100796 A1 | 5/2004 | Ward |
| 2004/0115339 A1 | 6/2004 | Nobuyuki |
| 2004/0125048 A1 | 7/2004 | Fukuda et al. |
| 2004/0125281 A1 | 7/2004 | Lin et al. |
| 2004/0170373 A1 | 9/2004 | Kim |
| 2004/0175577 A1 | 9/2004 | Lin et al. |
| 2004/0217919 A1 | 11/2004 | Pichl et al. |
| 2004/0218251 A1 | 11/2004 | Piehl et al. |
| 2004/0218390 A1 | 11/2004 | Holman et al. |
| 2005/0002082 A1 | 1/2005 | Miles |
| 2005/0041175 A1 | 2/2005 | Akiyama |
| 2005/0120553 A1 | 6/2005 | Brown |
| 2005/0179977 A1 | 8/2005 | Chui et al. |
| 2005/0195175 A1 | 9/2005 | Anderson |
| 2005/0195370 A1 * | 9/2005 | Gore et al. ................ 353/31 |
| 2005/0225686 A1 | 10/2005 | Brummack |

| | | | |
|---|---|---|---|
| 2005/0231977 A1 | 10/2005 | Hayakawa | |
| 2005/0248524 A1 | 11/2005 | Feng | |
| 2005/0259939 A1 | 11/2005 | Rinko | |
| 2005/0286113 A1 | 12/2005 | Miles | |
| 2006/0001942 A1 | 1/2006 | Chui | |
| 2006/0002141 A1 | 1/2006 | Ouderkirk | |
| 2006/0022966 A1 | 2/2006 | Mar | |
| 2006/0024017 A1 | 2/2006 | Page | |
| 2006/0044523 A1 | 3/2006 | Teijido | |
| 2006/0050032 A1 | 3/2006 | Gunner | |
| 2006/0066541 A1 | 3/2006 | Gally | |
| 2006/0066783 A1 | 3/2006 | Sampsell | |
| 2006/0066935 A1 | 3/2006 | Cummings et al. | |
| 2006/0067600 A1 | 3/2006 | Gally et al. | |
| 2006/0067651 A1 * | 3/2006 | Chui | 385/147 |
| 2006/0077154 A1 | 4/2006 | Gally et al. | |
| 2006/0077509 A1 | 4/2006 | Tung et al. | |
| 2006/0077510 A1 | 4/2006 | Chui et al. | |
| 2006/0132383 A1 | 6/2006 | Gally et al. | |
| 2006/0198013 A1 | 9/2006 | Sampsell | |
| 2006/0209012 A1 | 9/2006 | Hagood | |
| 2006/0209384 A1 | 9/2006 | Chui et al. | |
| 2006/0209385 A1 | 9/2006 | Liu et al. | |
| 2007/0042524 A1 | 2/2007 | Kogut | |
| 2007/0196040 A1 | 8/2007 | Wang et al. | |
| 2007/0201234 A1 | 8/2007 | Ottermann | |
| 2008/0112039 A1 | 5/2008 | Chui | |
| 2008/0151347 A1 | 6/2008 | Chui | |
| 2008/0218834 A1 | 9/2008 | Wang | |
| 2009/0086301 A1 | 4/2009 | Gally | |

FOREIGN PATENT DOCUMENTS

| | | |
|---|---|---|
| CN | 1381752 A | 11/2002 |
| DE | 196 22 748 | 12/1997 |
| DE | 196 22 748 A1 | 12/1997 |
| DE | 199 42 513 | 3/2001 |
| EP | 0590511 | 4/1994 |
| EP | 0822441 A2 | 2/1998 |
| EP | 0855745 A | 7/1998 |
| EP | 0 879 991 | 11/1998 |
| EP | 0 907 050 | 4/1999 |
| EP | 1014161 A | 6/2000 |
| EP | 1089115 | 4/2001 |
| EP | 1 127 984 | 8/2001 |
| EP | 1251454 A2 | 4/2002 |
| EP | 1251454 A3 | 4/2002 |
| EP | 1271223 A2 | 6/2002 |
| EP | 1 306 609 | 5/2003 |
| EP | 1 341 025 | 9/2003 |
| EP | 1389775 A2 | 2/2004 |
| EP | 1 413 543 | 4/2004 |
| EP | 1450418 A2 | 8/2004 |
| EP | 1519218 A1 | 3/2005 |
| EP | 1 531 302 | 5/2005 |
| EP | 1 640 770 | 3/2006 |
| EP | 1 640 779 | 3/2006 |
| EP | 1640764 | 3/2006 |
| EP | 1640776 | 3/2006 |
| EP | 2 068 182 | 6/2009 |
| GB | 2278222 A | 11/1994 |
| GB | 2321532 A | 7/1998 |
| JP | 56 088111 | 7/1981 |
| JP | 60 147718 | 8/1985 |
| JP | 04 190323 | 7/1992 |
| JP | 04 238321 | 8/1992 |
| JP | 08 094992 | 4/1996 |
| JP | 09 068722 | 3/1997 |
| JP | 09 160032 | 6/1997 |
| JP | 09 311333 | 12/1997 |
| JP | 10 500224 | 1/1998 |
| JP | 11 002764 | 1/1999 |
| JP | 11 174234 | 7/1999 |
| JP | 11174234 A | 7/1999 |
| JP | 11 211999 | 8/1999 |
| JP | 11 295725 | 10/1999 |
| JP | 2000 075293 | 3/2000 |
| JP | 2000 193933 | 7/2000 |
| JP | 2000 193933 | 11/2000 |
| JP | 2001 343514 | 12/2001 |
| JP | 2001/343514 A | 12/2001 |
| JP | 2002-523798 | 7/2002 |
| JP | 2002 245835 | 8/2002 |
| JP | 2002-245835 | 12/2002 |
| JP | 2003 131215 | 5/2003 |
| JP | 2003-131215 | 5/2003 |
| JP | 2003 173713 | 6/2003 |
| JP | 2003-188959 | 7/2003 |
| JP | 2003 188959 | 7/2003 |
| JP | 2003-315694 | 11/2003 |
| KR | 2003-29769 | 3/2002 |
| TW | 594155 | 6/2004 |
| WO | WO 95/01584 | 1/1995 |
| WO | WO 95/30924 | 5/1995 |
| WO | WO 96/08833 | 3/1996 |
| WO | WO 97/17628 | 5/1997 |
| WO | WO 97/44707 | 11/1997 |
| WO | WO 98/19201 | 5/1998 |
| WO | WO 00/11502 | 3/2000 |
| WO | WO 01/81994 | 11/2001 |
| WO | WO 01/84228 | 11/2001 |
| WO | WO 01/84229 | 11/2001 |
| WO | WO 02/071132 | 9/2002 |
| WO | WO 02/097324 | 12/2002 |
| WO | WO 03/007049 A1 | 1/2003 |
| WO | WO 03/105198 | 6/2003 |
| WO | WO 03/056876 | 7/2003 |
| WO | WO 03/075207 | 9/2003 |
| WO | WO 2004/006003 | 1/2004 |
| WO | WO 2004/027514 | 4/2004 |
| WO | WO 2004/003643 | 8/2004 |
| WO | WO 2005/076051 | 8/2005 |
| WO | WO 2005/093490 | 10/2005 |
| WO | WO 2006/036415 | 4/2006 |
| WO | WO 2006/036496 | 4/2006 |
| WO | WO 2006/036564 | 4/2006 |
| WO | WO 2008/039229 | 4/2008 |
| WO | WO 2008/045310 | 4/2008 |
| WO | WO 2008/045363 | 4/2008 |
| WO | WO 2008/045364 | 4/2008 |
| WO | WO 2008/109620 | 9/2008 |

OTHER PUBLICATIONS

Miles, et al., "Digital Paper for Reflective Displays", Journal of the Society for Information Display, San Jose, CA, vol. 11, No. 1, 2003, pp. 209-215.

Miles, "Interferometric Modulation: MOEMS as an Enabling Technology for High-Performance Reflective Displays", Proceedings of the SPIE, 4985:28, pp. 131-139, Jan. 2003.

Tai, C.Y. et al., "A Transparent Front Lighting System for Reflective-Type Displays," 1995 SID International Symposium Digest of Technical Papers, Orlando, May 23 -25, 1995, SID International Symposium Digest of Technical Papers, Santa Ana, SID, US vol. 26, May 23, 1995. pp. 375-378.

Aratani, et al., "Process and Design Considerations for Surface Micromachined Beams for a Tuneable Interferometer Array in Silicon", 0-7803-0957-2/93, IEEE, 1993, pp. 230-235.

Extended European Search Report for European Patent Application No. 05225715.4 dated Feb. 25, 2008.

Official Communication in Chinese App. No. 200510103443.4 dated Jun. 16, 2008.

Official Communication in Japanese App. No. 2005-231619 dated Jul. 1, 2008.

ISR and WO for International Application No. PCT/US2005/002986 dated Jun. 8, 2005 (Publication No. WO 2005/076051).

ISR and WO for International Application No. PCT/US2005/032886 dated Mar. 30, 2006 (Publication No. WO/2006 036564).
ISR and WO for International Application No. PCT/US2005/032021 dated Jan. 10, 2006 (Publication No. WO/2006 036496).
Austrian Search Report for U.S. Appl. No. 11/036,965 dated Jul. 25, 2005; (Publication No. 2005/0179977).
Austrian Search Report for U.S. Appl. No. 11/052,004 dated Jul. 1, 2005; (Publication No. 2006/0077509).
Austrian Search Report for U.S. Appl. No. 11/057,392 dated May 12, 2005; (Publication No. 2006/0077510).
Austrian Search Report for U.S. Appl. No. 11/064,143 dated Aug. 12, 2005;(Publication No. 2006/0132383).
Extended European Search Report for European Application No. 05255638.8 dated May 4, 2006 (Publication No. EP 1640764).
European Search Report for European Application No. 05255703.0 dated Jan. 19, 2006 (Publication No. EP 1640776).
Office Action dated Jun. 26, 2006 in U.S. Appl. No. 11/052,004.
Response and Amendment dated Sep. 26, 2006 in U.S. Appl. No. 11/052,004.
Notice of Allowance dated Jan. 2, 2007 in U.S. Appl. No. 11/052,004.
RCE and IDS dated Apr. 2, 2007 in U.S. Appl. No. 11/052,004.
Notice of Allowance dated Apr. 27, 2007 in U.S. Appl. No. 11/052,004.
RCE and IDS dated Jul. 26, 2007 in U.S. Appl. No. 11/052,004.
Notice of Allowance dated Aug. 10, 2007 in U.S. Appl. No. 11/052,004.
RCE and IDS dated Sep. 18, 2007 in U.S. Appl. No. 11/052,004.
Notice of Allowance dated Oct. 24, 2007 in U.S. Appl. No. 11/052,004.
ISR and WO for International Application No. PCT/US2005/006629 dated Jun. 6, 2005 (Publication No. WO 2005/093490).
ISR and WO for International Application No. PCT/US2007/021460 dated May 14, 2008 (Publication No. WO 2008/045364).
ISR and WO for International Application No. PCT/US2005/030441 dated Dec. 12, 2005 (Publication No. WO 2006/036415).
Office Action dated Aug. 28, 2006 in U.S. Appl. No. 11/156,162.
Response and Amendment dated Nov. 28, 2006 in U.S. Appl. No. 11/156,162.
Office Action dated Jul. 24, 2007 in U.S. Appl. No. 11/156,162.
Response and Amendment dated May 14, 2007 in U.S. Appl. No. 11/156,162.
Supplementary Amendment dated May 14, 2007 in U.S. Appl. No. 11/156,162.
Office Action dated Jul. 31, 2007 in U.S. Appl. No. 11/156,162.
Response and Amendment dated Oct. 30, 2007 in U.S. Appl. No. 11/156,162.
Notice of Allowance dated Jan. 29, 2008 in U.S. Appl. No. 11/156,162.
RCE and IDS dated Apr. 28, 2008 in U.S. Appl. No. 11/156,162.
Notice of Allowance dated Aug. 12, 2007 in U.S. Appl. No. 11/156,162.
Issue Fee payment, dated Nov. 11, 2008, in U.S. Appl. No. 11/156,162.
Petition Under 37 CFR §1.313 (c) to Withdraw from Issue in U.S. Appl. No. 11/156,162, dated Nov. 18, 2008.
Patent Withdrawal Notice in U.S. Appl. No. 11/156,162, dated Nov. 20, 2008.
Office Action dated Feb. 14, 2007 in U.S. Appl. No. 11/357,702.
Response and Amendment dated Apr. 10, 2007 in U.S. Appl. No. 11/357,702.
Final Office Action dated May 10, 2007 in U.S. Appl. No. 11/357,702.
RCE and Amendment dated Oct. 10, 2007 in U.S. Appl. No. 11/357,702.
Notice of Allowance dated Nov. 2, 2007 in U.S. Appl. No. 11/357,702.
RCE and IDS dated Jan. 22, 2008 in U.S. Appl. No. 11/357,702.
Notice of Allowance dated Feb. 25, 2008 in U.S. Appl. No. 11/357,702.
RCE and IDS dated May 23, 2008 in U.S. Appl. No. 11/357,702.
Notice of Allowance dated Jun. 18, 2008 in U.S. Appl. No. 11/357,702.
RCE and IDS dated Sep. 17, 2008 in U.S. Appl. No. 11/357,702.
Notice of Allowance dated Sep. 29, 2008 in U.S. Appl. No. 11/357,702.
Written Opinion for International Application No. PCT/US 07/04277 dated Apr. 3, 2008 (Publication No. WO 2008/039229).
International Preliminary Report on Patentability for International Application No. PCT/US 07/04277 dated Aug. 19, 2008 (Publication No. WO 2008/039229).
Official Communication in Chinese Application No. 200510105055 dated Jul. 4, 2008.
Official Communication in European Application No. 05255638.8 dated Aug. 21, 2008.
Official Communication in European Application No. 05255638.8 dated Jan. 5, 2007.
Official Communication in Japanese Application No. 2005-265709 dated Oct. 21, 2008.
Official Communication in Mexican Application No. PA/a/2005/010248 dated Apr. 24, 2008.
International Search Report in App. No. PCT/US03/20433 dated Sep. 23, 2003 (International Publication No. WO 2004/006003.
International Search Report in App. No. PCT/US2008/055829 dated Jul. 4, 2008 (International Publication No. WO 2008/109620).
ISR and Written Opinion for PCT/US2007/021459 dated May 14, 2008; PCT Publication No. WO 2008/045363).
ISR and Written Opinion for PCT/US2007/021375 dated May 14, 2008; PCT Publication No. WO 2008/045310).
Official Communication in Japanese Patent Application No. 2005-231619 mailed Nov. 10, 2009.

* cited by examiner

|  | Column Output Signals | |
|---|---|---|
|  | $+V_{bias}$ | $-V_{bias}$ |
| Row Output Signals   0 | Stable | Stable |
| $+\Delta V$ | Release | Actuate |
| $-\Delta V$ | Actuate | Release |

METHOD AND POST STRUCTURES FOR INTERFEROMETRIC MODULATION

CROSS-REFERENCE TO RELATED APPLICATIONS

This application is a continuation of U.S. patent application Ser. No. 11/052,004, filed Feb. 4, 2005, which claims priority benefit under 35 U.S.C. §119(e) to U.S. Provisional Patent Application Ser. No. 60/613,471, filed Sep. 27, 2004, which are hereby incorporated by reference in their entireties.

BACKGROUND

1. Field of the Invention

This invention relates generally to optical modulator devices and methods for making optical modulators, and more particularly to interferometric modulators used in displays.

2. Description of the Related Art

A variety of different types of spatial light modulators can be used for imaging applications. One type of a spatial light modulator is an interferometric modulator. Interferometric modulator devices can be arranged in an array configuration to provide a display assembly having advantageous operational and performance characteristics. Interferometric modulator devices operate by employing optical interference to provide displays having rich color characteristics as well as low power consumption. Interferometric modulators have at least two states and are configured such that, in at least one of the states, incident light is reflected and interferes to provide corresponding different appearances to a viewer. In one state, a relatively narrow band reflection may present a distinct color to the viewer, such as a red, green, or blue color. In another state, the interferometric modulator can act on the incident light so as to present a reflected dark or black appearance to a viewer.

In order to provide increased contrast in the various viewing states, it is desirable that an array of interferometric devices presents a more uniformly dark or black appearance in the dark state. Similarly, it is desirable in the colored viewing states to present colors which are richer and more vibrant.

SUMMARY

The system, method, and devices described herein each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of the systems, methods and devices described herein provide advantages that include, for example, improved device performance.

An embodiment provides a spatial light modulator (e.g., an interferometric modulator) that includes a post structure, wherein the post structure contains an optical element. In a preferred embodiment, the optical element in the post structure is a reflective element, e.g., a mirror. In another embodiment, the optical element in the post structure is an etalon, e.g., a dark etalon. In another embodiment, the post structure comprises a reflective element and a dark etalon.

The optical element in the post structure may be configured in various ways. For example, in certain embodiments, the optical element in the post structure decreases the amount of light that would otherwise be retroreflected from the post structure. In other embodiments, the optical element in the post structure increases the backlighting of the interferometric modulator. In various embodiments, the optical element in the post structure increases the brightness of the interferometric modulator by redirecting light into the interferometric cavity.

Another embodiment provides a method for making an interferometric modulator. In this method, a reflective layer is deposited onto a substrate to form a first mirror. A sacrificial layer is deposited over the first mirror. Apertures are formed in the sacrificial layer and post material is deposited into the apertures. An optical element is formed over the post material and a moveable second mirror is formed over the sacrificial layer and the optical element. The sacrificial layer is removed to thereby form an interferometric cavity.

These and other embodiments are described in greater detail below.

BRIEF DESCRIPTION OF THE DRAWINGS

These and other aspects of the invention will be readily apparent from the following description and from the appended drawings (not to scale), which are meant to illustrate and not to limit the invention, and wherein.

DETAILED DESCRIPTION OF PREFERRED EMBODIMENTS

As described more fully below, reflective optical elements may be included in post structures in interferometric modulators. In certain embodiments, these reflective optical elements may form etalons that reflect a particular color or wavelength range. Such etalons, which may comprise, for example, dark etalons, may cause the post structure to appear dark as seen by a viewer. These optical elements may increase the contrast of a display by providing a more uniformly dark or black appearance (reducing the area of the display that is relatively bright) when the interferometric modulator is in a dark state. Similarly, brighter more vibrant colors that are not "washed out" by bright regions are provided when the interferometric modulator is in a bright state. Reflective elements may also be included that direct illumination, either backlighting or front lighting, into the optical cavity of the interferometric modulator.

As will be apparent from the following description, the structures described herein may be implemented in any device that is configured to display an image, whether in motion (e.g., video) or stationary (e.g., still image), and whether textual or pictorial. More particularly, it is contemplated that the structures and methods may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures (e.g., tile layouts), packaging, and aesthetic structures (e.g., display of images on a piece of jewelry). More generally, the structures and methods described herein may be implemented in electronic switching devices, their manufacture, and use.

The following detailed description is directed to certain specific embodiments of the invention. However, the invention can be embodied in a multitude of different ways. In this description, reference is made to the drawings wherein like parts are designated with like numerals throughout.

Figure 1:
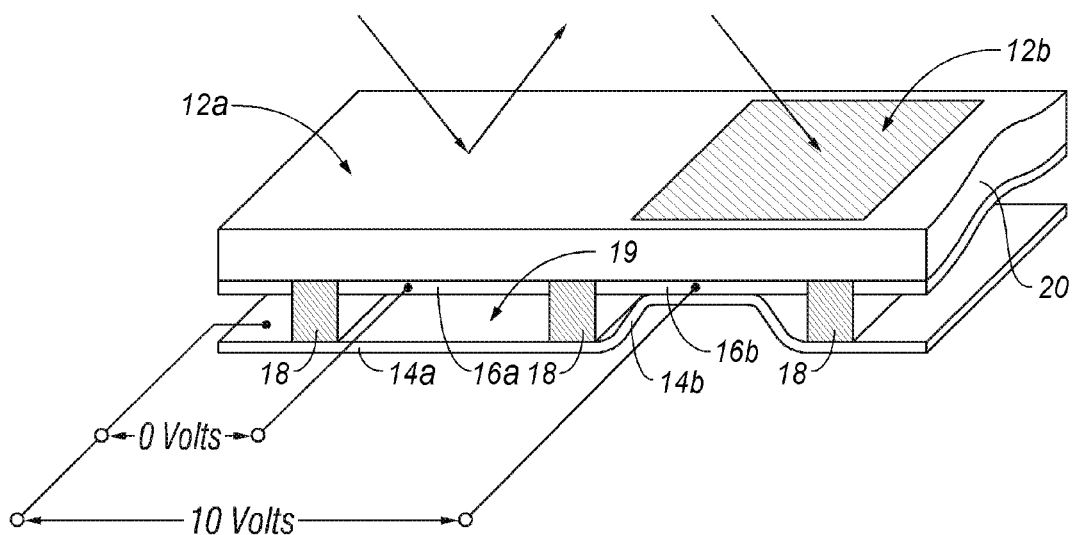
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable and highly reflective layer 14a is illustrated in a released position at a predetermined distance from a fixed partially reflective layer 16a. In the interferometric modulator 12b on the right, the movable highly reflective layer 14b is illustrated in an actuated position adjacent to the fixed partially reflective layer 16b.

The fixed layers 16a, 16b are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14a, 14b may be formed as a series of parallel strips of a deposited metal layer or layers (orthogonal to the row electrodes 16a, 16b) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14a, 16a and the deformable layer is in a mechanically relaxed state as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
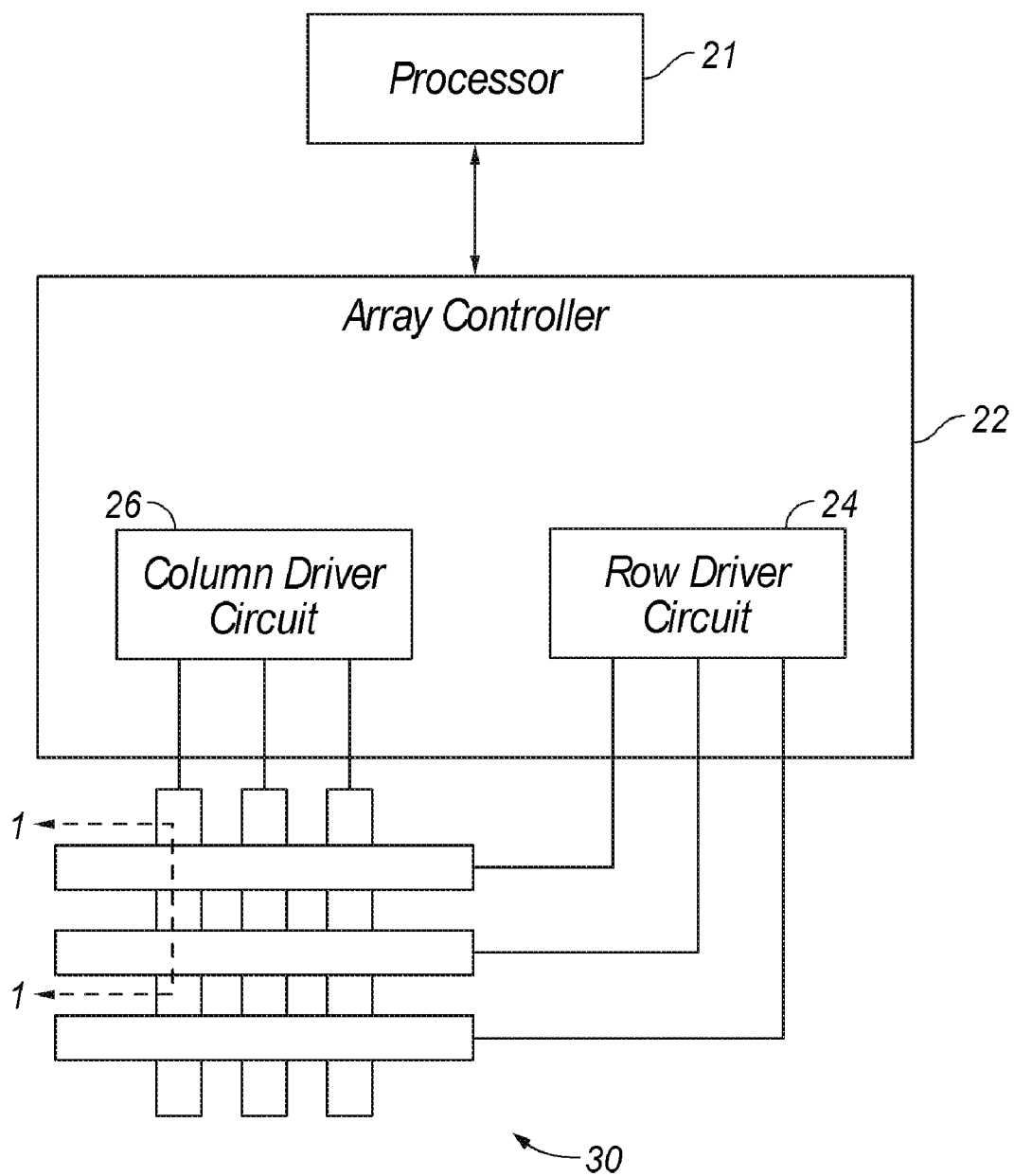
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
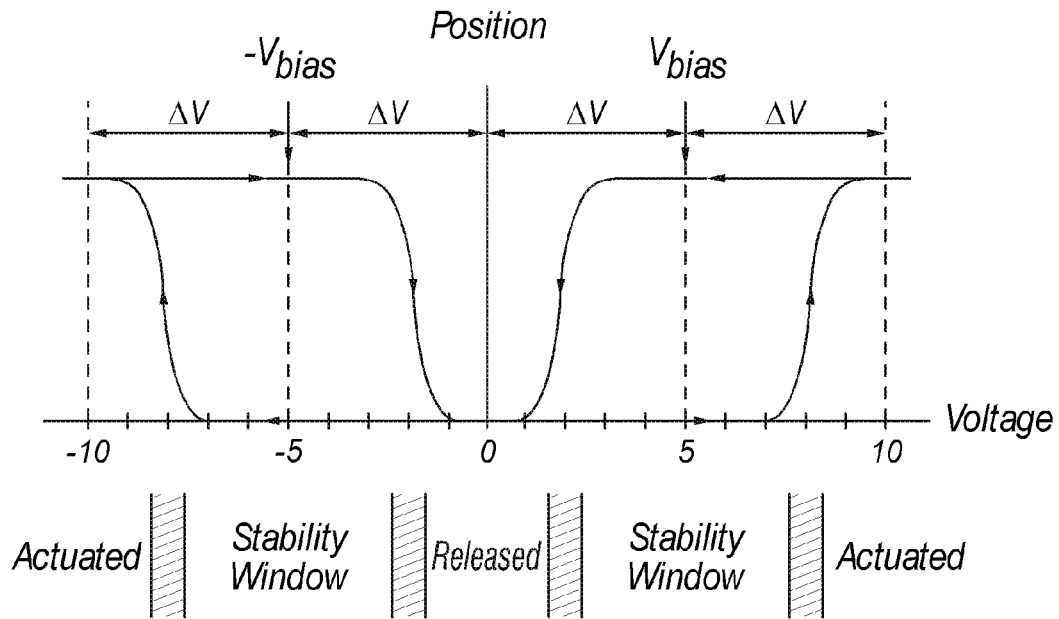
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Releasing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
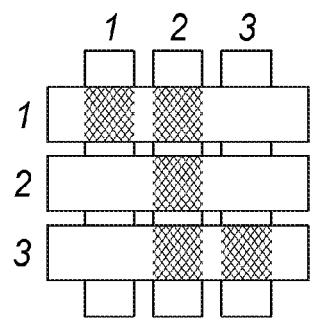
FIGS. 5A and 5B illustrate one exemplary timing diagram for row and column signals that may be used to write a frame of display data to the 3×3 interferometric modulator display of FIG. 2.
Figure 5B:
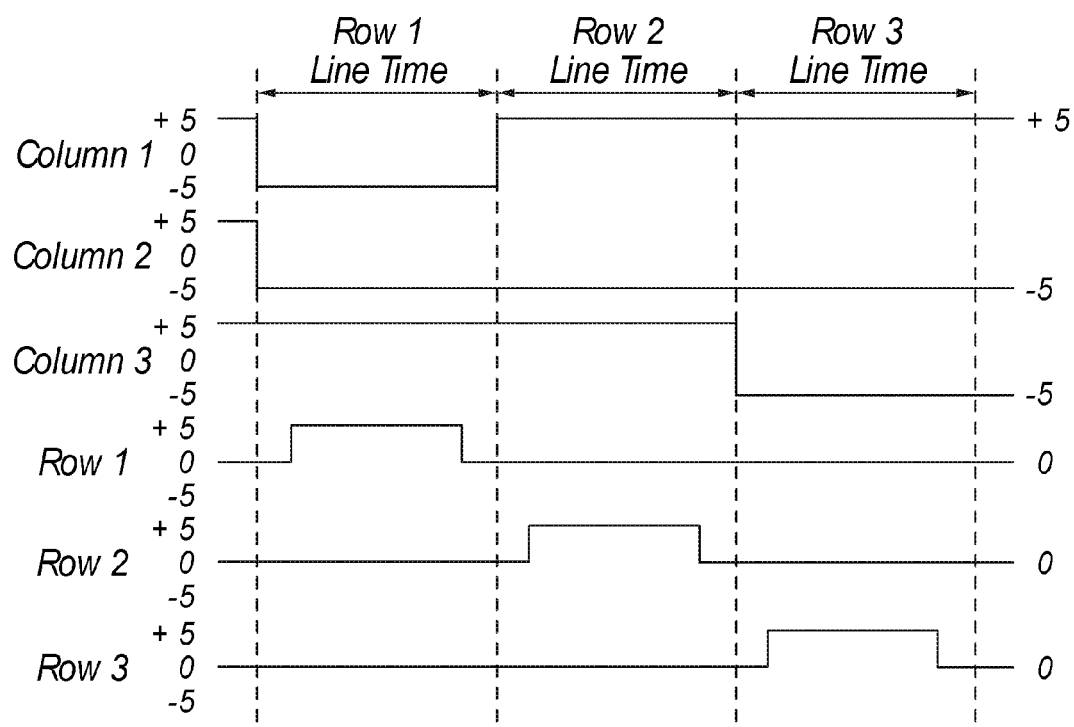

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
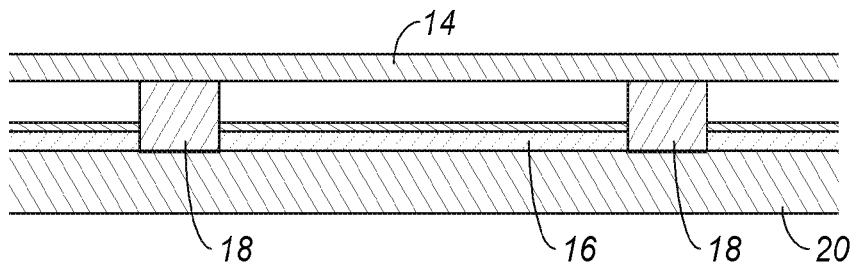
FIG. 6A is a cross section of the device of FIG. 1.
Figure 6B:
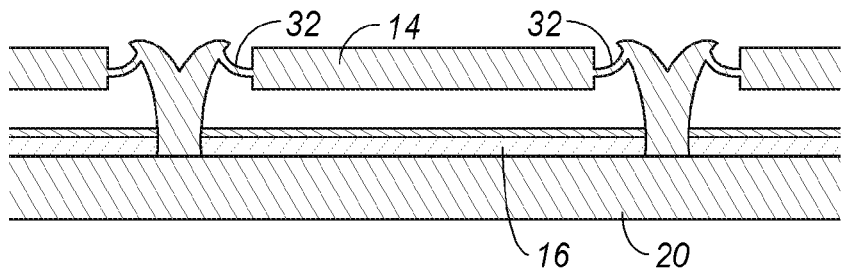
FIG. 6B is a cross section of an alternative embodiment of an interferometric modulator.
Figure 6C:
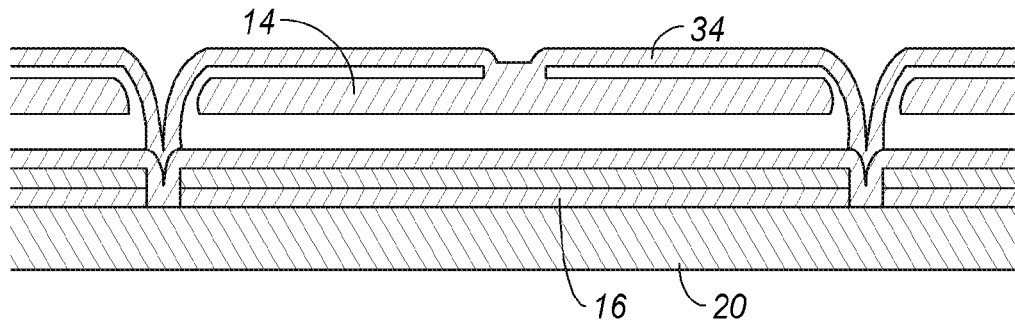
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Interferometric modulators of the general design discussed above comprise at least one post structure. (See, e.g., post 18 in FIGS. 1 and 6). A "post" or "post structure" is a structure located at the side or corner of an interferometric cavity (or between adjoining interferometric cavities) that supports an electrode (and/or mirror) and/or maintains or helps to maintain a desired distance between electrodes (and/or mirrors). Accordingly, the post structure may be adjacent an open region and may be an orthogonally extending support (e.g., support 18). As described above, the electrode or mirror supported by the post structure may comprise a flexible member that flexes in the open region in the interferometric modulator with application of an electric field in the cavity. Post structures typically have a width of about 3 to about 15 microns, although the width of the post structure may be outside this range. The shape of the post structure may vary as well. The post structure may have a height that corresponds approximately to the cavity height (e.g., the spacing between the upper and lower mirrors). The height of the post structure, however, may be larger or smaller. For example, the post structure may be formed on a layer of material or on a pedestal and thus be raised to a level above the lower mirror. Similarly, the post structure may extend to a height higher than the upper mirror or to a depth lower than the lower mirror. See, e.g., FIG. 6C which shows the upper mirror attached to an electrode supported by the post structure.

Figure 7A:
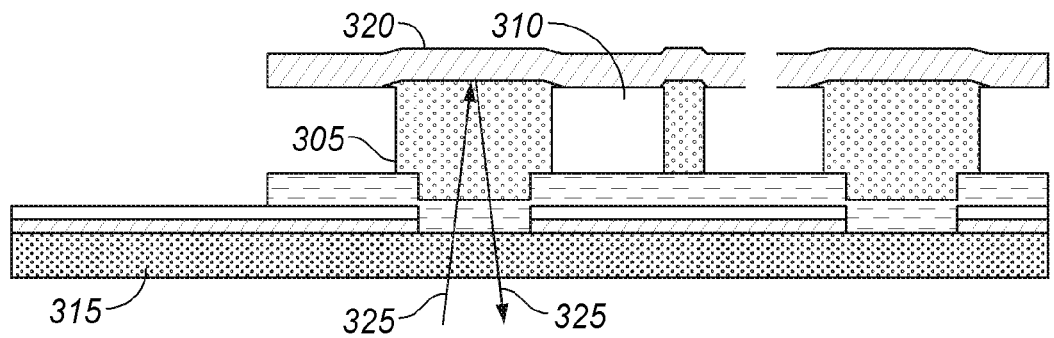
FIG. 7A shows a cross section of an interferometric modulator that schematically illustrates a post structure that is transparent.

Post structures may be formed from various materials (e.g., metals, silicon oxide, metal oxides, polymers, etc.) having optical properties that may differ significantly from one another. It has been found that the configuration of the post structure and the material(s) from which it is constructed may significantly affect the performance of the interferometric modulator. For example, FIG. 7A shows a cross-section of an interferometric modulator that schematically illustrates a transparent post structure 305 and an interferometric cavity 310. Light entering through the substrate 315 and entering the post structure 305 may reflect from the upper mirror structure 320 and exit back through the substrate 315 as depicted by the series of arrows 325 in FIG. 7A. The optical characteristics of the post are largely uncontrolled and unlikely to be beneficial when the configuration of the post 305 and the material(s) from which it is made are selected for reasons unrelated to the optical characteristics of the reflected light depicted by the series of arrows 325.

Figure 7B:
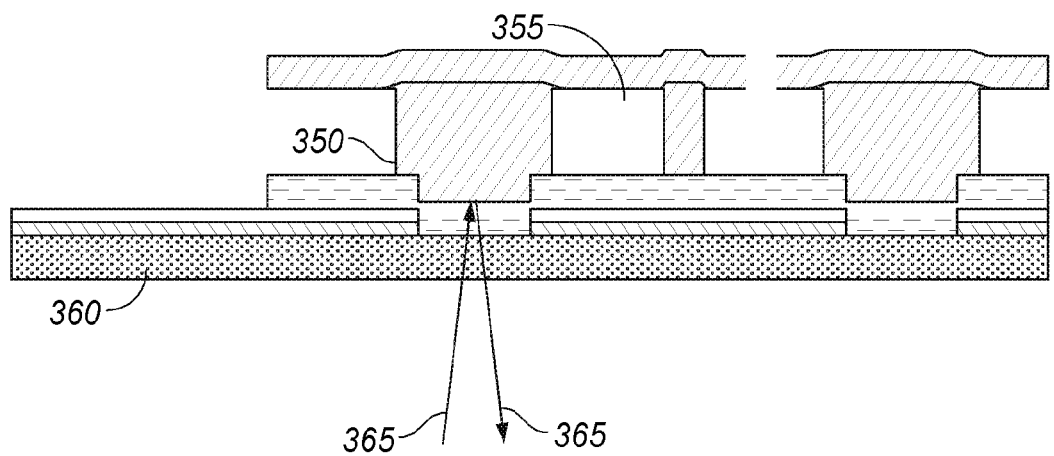
FIG. 7B shows a cross section of an interferometric modulator that schematically illustrates a post structure that is reflective.

As another example, FIG. 7B shows a cross-section of an interferometric modulator that schematically illustrates a reflective post structure 350 and an interferometric cavity 355. Light entering through the substrate 360 reflects from the base of the post 350 and exits back through the substrate 360 as depicted by the series of arrows 365 in FIG. 7B. As in FIG. 7A, the optical characteristics of the reflected light depicted by the series of arrows 365 are uncontrolled and unlikely to be beneficial.

Figure 8A:
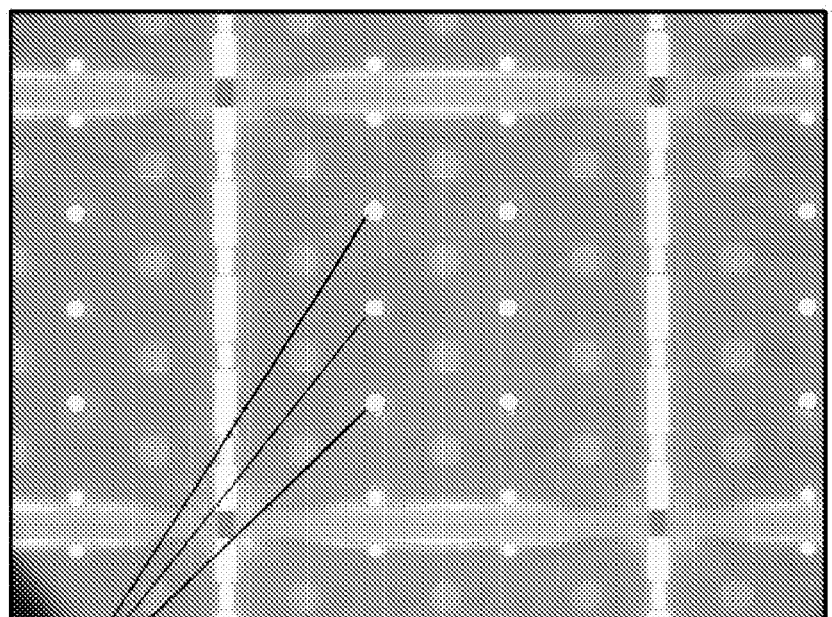
FIG. 8A is a reproduction of a photomicrograph of an array of interferometric modulators having metal posts.
Figure 8B:
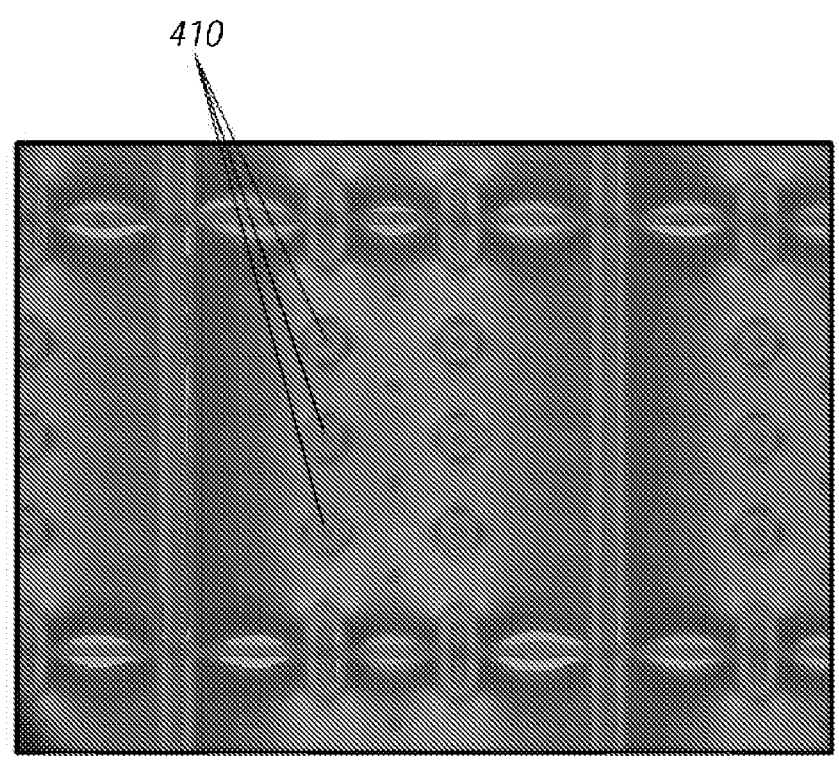
FIG. 8B is a reproduction of a photomicrograph of an array of interferometric modulators having silicon oxide posts.

As another example, FIG. 8A shows a photomicrograph of an array of interferometric modulators having metal posts. The bright spots 405 result from light reflecting from the bases of the metal posts. FIG. 8B shows a similar photomicrograph in which the dark spots 410 result from light passing through transparent silicon oxide posts. The color of the dark spots 410 is generally different from the light that exits from the interferometric modulators.

Figure 9:
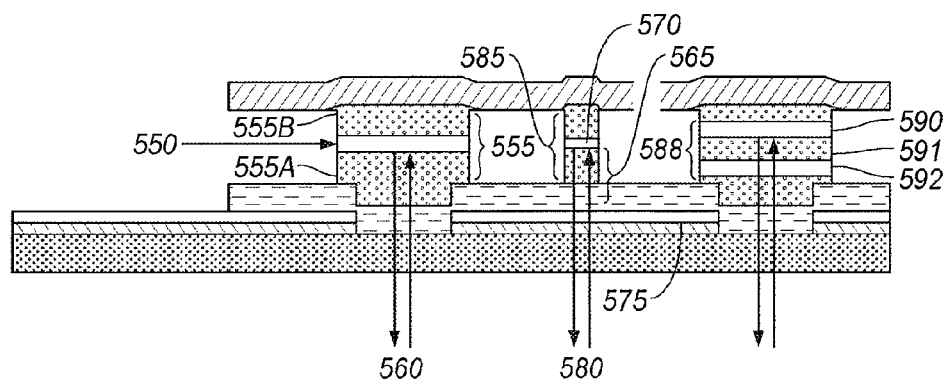
FIG. 9 shows a cross-section of an interferometric modulator that schematically illustrates post structures that comprise reflective elements, some of which form etalons.

It has now been found that optical elements may be incorporated into the post structures of interferometric modulators in order to provide various desirable optical effects. In one embodiment, the optical element is a reflector. This reflector may have various configurations. For example, FIG. 9 shows a cross-section of an interferometric modulator that schematically illustrates post structures that comprise optical elements. In FIG. 9, a reflector 550 is fabricated within a transparent post structure 555. This reflector 550 has a reflective surface that reflects incoming light incident thereon. This reflector 550 may comprise a reflective material such as metal. The reflector 550 may be formed using semiconductor fabrication techniques, for example, by depositing silicon oxide as a lower post section 555A, then forming the reflector 550 comprising, e.g., metal, then depositing additional silicon oxide as an upper post section 555B. The optical element within the post structure may also be a reflector that is a component of an etalon (Fabry-Perot interferometer), e.g., an etalon 565 formed by an upper metal reflector 570 and the reflector 575. The etalon 565 forms an optical cavity (a Fabry-Perot cavity) that contains the post structure material(s), e.g., silicon oxide. The color of reflected light 580 exiting the etalon 565 may be controlled by controlling the vertical position of the reflector 570 within the post structure 585 (as well as the material between the reflectors 570 and 575). The color of the reflected light 580 may be adjusted to produce a black appearance by adjusting the vertical position of the reflector so that substantially all of the incident light or visible incident light is absorbed or is not reflected back toward a viewer, thereby producing a dark etalon. An etalon 588 (e.g., a dark or colored etalon) may also be incorporated into a post structure by incorporating two metal reflector layers 590, 592 into the post structure as illustrated in FIG. 9. The color of the etalon 588 may be adjusted by controlling the thickness of the post material 591 between the reflector layers.

Figure 10:
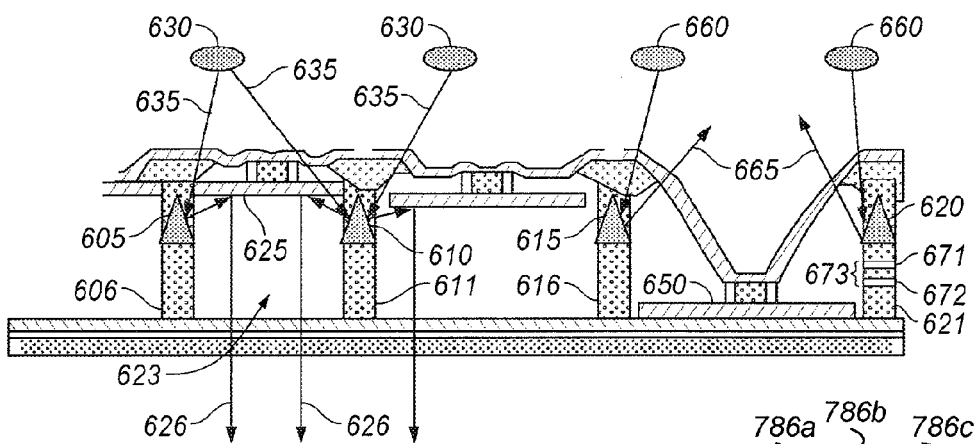
FIG. 10 shows a cross-section of a backlit interferometric modulator schematically illustrating post structures that comprise reflective elements configured to direct light into the optical cavity of the interferometric modulator.

The reflectors 550, 570, 590 and 592 are depicted in FIG. 9 as having reflective surfaces that are substantially parallel to the reflector 575. Those skilled in the art will understand that optical elements such as reflectors may be oriented at various angles and configured in various shapes. FIG. 10 shows additional examples of optical elements that may be incorporated into the post structures of interferometric modulators. In FIG. 10, reflectors 605, 610, 615, 620 have been fabricated within post structures 606, 611, 616, 621 using semiconductor fabrication techniques. The surfaces of the reflectors 605, 610, 615, 620 are inclined at various angles. Optical elements having angled surfaces may be fabricated using various techniques known to those skilled in the art. Such techniques include, for example, tapered angle etching (see, e.g., U.S. Pat. No. 5,473,710). On the left side of FIG. 10, the upper mirror 625 is in a raised position. Light from a backlight source 630 is reflected from the inclined surfaces of the reflectors 605, 610 to the upper mirror 625 as indicated by the series of arrows 635. Thus, the reflectors 605, 610 are examples of optical elements configured to direct light into the interferometric cavity 623. The directed light also reflects from the upper mirror 625 and exits as indicated by the arrows 626, thereby increasing the brightness of the interferometric modulator.

On the right side of FIG. 10, the upper mirror 650 is in a lowered position. Light from the backlight source 660 is reflected from the inclined surfaces of the reflectors 615, 620 generally back towards the source 660 (instead of through the post structure) as indicated by the series of arrows 665. FIG. 10 also illustrates a dark etalon 673 formed by incorporating two metal reflectors 671, 672 into the post structure 621 that includes reflector 620. Thus, FIG. 10 illustrates the use of optical elements within post structures to control backlighting and the incorporation of multiple optical elements into the same post structure. Those skilled in the art will appreciate that FIG. 10 illustrates that the performance of an optical element in a post structure may vary depending on the state (e.g., driven or undriven) of a nearby interferometric modulator.

Figure 11:
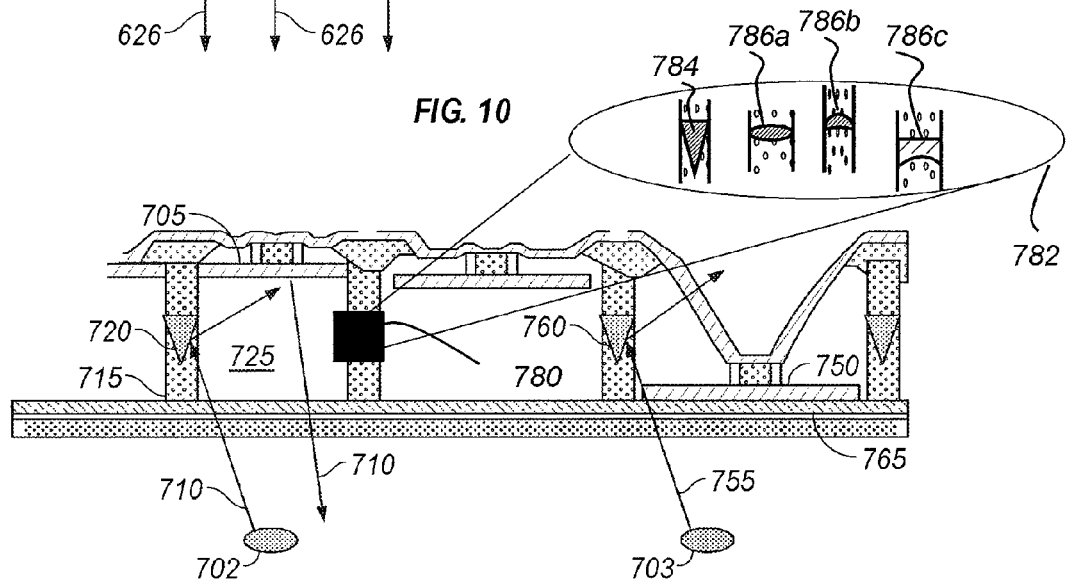
FIG. 11 shows a cross-section of a front lit interferometric modulator schematically illustrating post structures that comprise reflective elements configured to increase brightness of the interferometric modulator.

FIG. 11 illustrates the use of an optical element in a post structure to increase the brightness of an interferometric modulator by redirecting light coming from the front of the interferometric modulator into the interferometric cavity. On the left side of FIG. 11, the upper mirror 705 is in a raised position. A series of arrows 710 represents light coming from a front source 702 that enters a post structure 715, reflects from an angled reflector 720 to the upper mirror 705, and then exits the interferometric cavity 725 back in the general direction of the source 702, thereby increasing brightness. On the right side of FIG. 11, the upper mirror 750 is in a lowered position, and a similar configuration is used to increase black level by redirecting light (represented by a series of arrows 755) away from the source 703. Thus light from the front source 703 reflects from the angled surface of the reflector 760 and exits the back side of the interferometric cavity 765 in a direction generally away from the source 703.

Those skilled in the art will understand that various optical elements 780 having a variety of configurations may be incorporated into post structures. Non-limiting examples of such optical elements 780 include reflectors 720 and 760 etalons, light scattering elements (such as microscopic glass particles), light diffracting elements, total internal reflection (TIR) elements, and refractive elements. Lenses 786a, 786b, 786c and prisms 784 are possible, as schematically illustrated in the exploded inset 782 of FIG. 11. The surfaces of the optical elements 780, such as the surfaces of the reflectors, may be curved (e.g., spherical or parabolic) or flat, and inclined or declined at various angles. Likewise, lenses 786a, 786b, 786c may be configured in various ways, e.g., convex as illustrated by the lenses 786a, 786b, concave as illustrated by the lens 786c, etc., and also may be inclined or declined at various angles within the post structure. Asymmetrical as well as symmetrical shapes and configurations are possible. These surfaces of the optical elements may be smooth or rough. Reflection may be specular or diffuse. The optical elements may be located in different positions in the post structure. The optical element may be located at different heights and may be off-center within the post. The optical element may have different orientations and may be tilted. Different posts structures may have optical elements with different characteristics.

Figure 12:
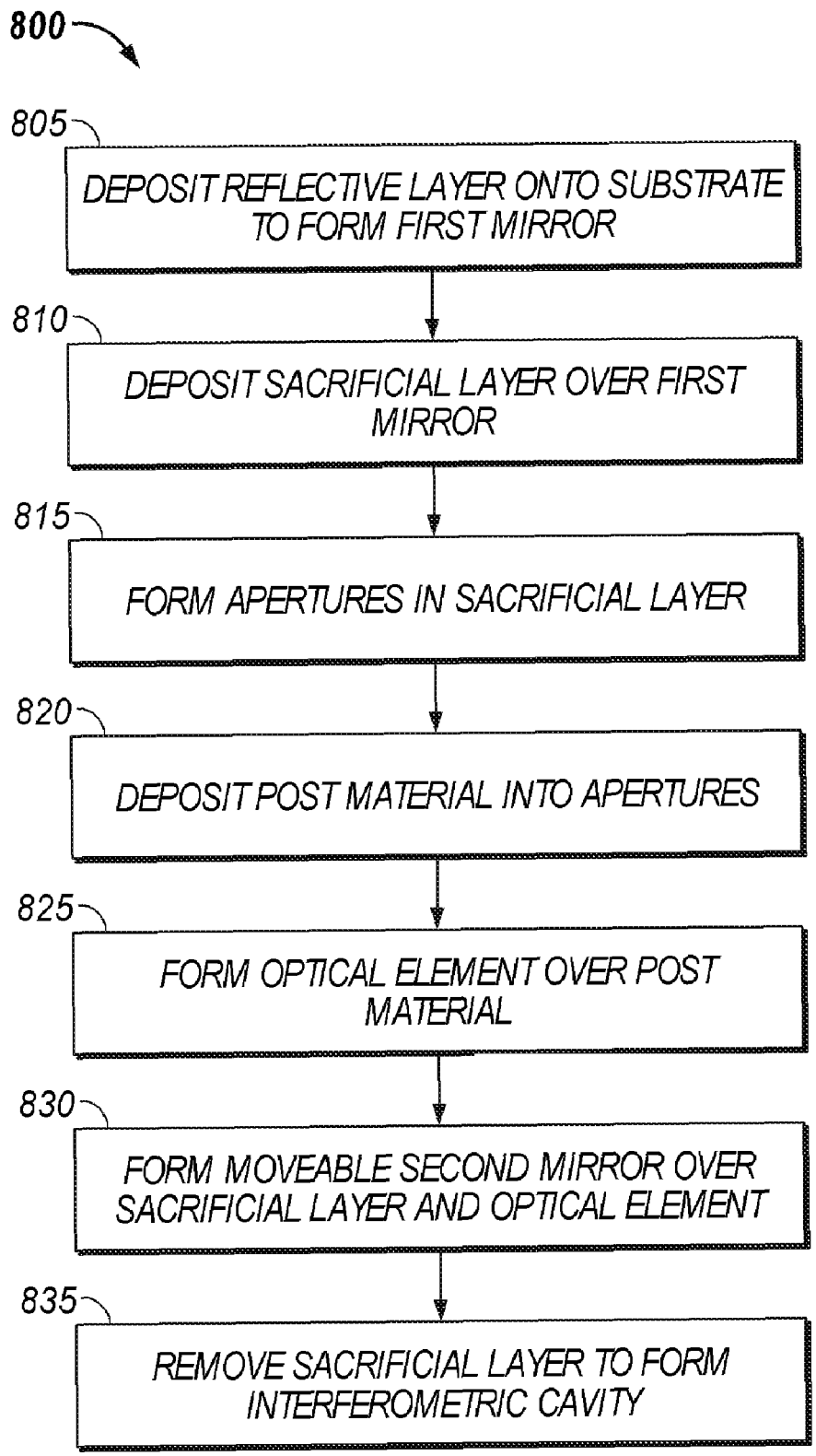
FIG. 12 shows a flow chart illustrating a process for making an interferometric modulator having a post structure that contains an optical element.

Another embodiment provides a method for making an interferometric modulator. The steps in such a method 800 (FIG. 12) may be carried out using techniques known to those skilled in the art. The process begins at step 805 by depositing a reflective layer onto a substrate to form a first mirror. The deposition of the reflective layer may be conducted by, e.g., chemical vapor deposition of a semi-reflective material such as a metal (e.g., indium tin oxide and/or chrome). The formation of the first mirror at step 805 may further comprise depositing a dielectric material (e.g., silicon oxide) over the metal layer. Those skilled in the art will understand that the first mirror may be an optical stack, and thus formation of the first mirror at step 805 may involve depositing multiple metal layers, e.g., chrome and indium tin oxide.

The process continues at step 810 by depositing a sacrificial layer over the first mirror. The deposition of the sacrificial layer may be conducted by, e.g., chemical vapor deposition of a material that may be selectively removed in a later etching step. Examples of such sacrificial materials include molybdenum and silicon. The process continues at step 815 by forming apertures in the sacrificial layer using masking and etching techniques known to those skilled in the art. The process continues at step 820 by depositing post material into the apertures. Post material that is optically transmissive to visible light may be used. Examples of suitable post materials include silicon dioxide and photoresists, which may be deposited by, e.g., known spin-on and chemical vapor deposition techniques. In an embodiment, the deposited post material partially fills the apertures, depending on the desired vertical position of the optical element within the post. A layer of material for forming the optical element is deposited over the post material within the aperture in a subsequent step 825. Various known deposition and/or patterning methods (such as tapered etching for angled surfaces) may be used to form the optical element. Optionally, additional post material may be deposited over the optical element within the aperture.

The process continues at step 830 by forming a moveable second mirror over the sacrificial layer and the optical element. The formation of the moveable second mirror may be conducted in various ways, depending on the desired mirror configuration as discussed above. The process continues at step 835 by removing the sacrificial layer to thereby form an interferometric cavity. Various etching methods may be used to efficiently remove the sacrificial layer, e.g., by exposing the sacrificial layer to an etchant such as $XeF_2$ that selectively removes sacrificial materials such as molybdenum and silicon. Those skilled in the art will understand that the process illustrated in FIG. 12 may be modified as needed to produce interferometric modulators having a variety of configurations.

Those skilled in the art will appreciate that a post structure may contain a plurality of optical elements. For examples, two or more reflectors may be fabricated into a post structures at various heights using minor modifications of the fabrication methods described above. Those skilled in the art will also appreciate that the use of such a plurality of optical elements in a post structure may be used to provide various optical benefits or combinations thereof, e.g., a wider variety of colors than the use of a single optical element.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. An interferometric modulator comprising:
   a substrate;
   a first reflective surface over the substrate, the first reflective surface being at least partially reflective and at least partially transparent to light;
   a second reflective surface over the first reflective surface, the second reflective surface movable with respect to the first reflective surface; and
   a support structure configured to at least partially support the second reflective surface, the support structure comprising an optical element,
   wherein the optical element is disposed at a height between the first reflective surface and the second reflective surface.

2. The interferometric modulator of claim 1, wherein surfaces of the optical element are symmetrical.

3. The interferometric modulator of claim 1, wherein surfaces of the optical element are smooth.

4. The interferometric modulator of claim 1, wherein the optical element comprises a reflector having an inclined surface.

5. The interferometric modulator of claim 1, wherein the optical element comprises a reflector having declined surface.

6. The interferometric modulator of claim 1, wherein the optical element comprises a reflector having a flat surface.

7. The interferometric modulator of claim 1, wherein the optical element comprises an etalon.

8. The interferometric modulator of claim 1, wherein the optical element comprises a lens.

9. The interferometric modulator of claim 1, wherein the optical element comprises a prism.

10. The interferometric modulator of claim 1, wherein the optical element comprises a reflector.

11. The interferometric modulator of claim 1, wherein the optical element comprises a specular reflector.

12. The interferometric modulator of claim 1, wherein the optical element comprises a diffuse reflector.

13. The interferometric modulator of claim 1, wherein the interferometric modulator comprises a reflective modulator.

14. The interferometric modulator of claim 1, wherein the interferometric modulator comprises a MEMS interferometric modulator.

15. An interferometric modulator comprising:
a substrate;
a first reflective surface over the substrate, the first reflective surface being at least partially reflective and at least partially transparent to light;
a second reflective surface over the first reflective surface, the second reflective surface movable with respect to the first reflective surface; and
a support structure configured to at least partially support the second reflective surface, the support structure comprising an optical element,
wherein the optical element comprises a lens or a prism.

16. The interferometric modulator of claim 15, wherein the optical element comprises a lens.

17. The interferometric modulator of claim 16, wherein at least one surface of the lens is convex.

18. The interferometric modulator of claim 15, wherein the optical element comprises a prism.

19. The interferometric modulator of claim 18, wherein surfaces of the prism are inclined with respect to the support structure.

20. The interferometric modulator of claim 18, wherein surfaces of the prism are declined with respect to the support structure.

21. The interferometric modulator of claim 15, wherein the interferometric modulator comprises a reflective modulator.

22. The interferometric modulator of claim 15, wherein the interferometric modulator comprises a MEMS interferometric modulator.

23. The interferometric modulator of claim 16, wherein at least one surface of the lens is concave.

24. An interferometric modulator comprising:
a substrate;
a first reflective surface over the substrate, the first reflective surface being at least partially reflective and at least partially transparent to light;
a second reflective surface over the first reflective surface, the second reflective surface movable with respect to the first reflective surface; and
a support structure configured to at least partially support the second reflective surface, the support structure comprising an optical element, wherein surfaces of the optical element are asymmetrical.

25. An interferometric modulator comprising:
a substrate;
a first reflective surface over the substrate, the first reflective surface being at least partially reflective and at least partially transparent to light;
a second reflective surface over the first reflective surface, the second reflective surface movable with respect to the first reflective surface; and
a support structure configured to at least partially support the second reflective surface, the support structure comprising an optical element, wherein surfaces of the optical element are rough.

26. An interferometric modulator comprising:
a substrate;
a first reflective surface over the substrate, the first reflective surface being at least partially reflective and at least partially transparent to light;
a second reflective surface over the first reflective surface, the second reflective surface movable with respect to the first reflective surface; and
a support structure configured to at least partially support the second reflective surface, the support structure comprising an optical element, wherein the optical element is configured to specularly reflect light.

27. An interferometric modulator comprising:
a substrate;
a first reflective surface over the substrate, the first reflective surface being at least partially reflective and at least partially transparent to light;
a second reflective surface over the first reflective surface, the second reflective surface movable with respect to the first reflective surface; and
a support structure configured to at least partially support the second reflective surface, the support structure comprising an optical element, wherein the optical element is configured to diffusely reflect light.

28. An interferometric modulator comprising:
a substrate;
a first reflective surface over the substrate, the first reflective surface being at least partially reflective and at least partially transparent to light;
a second reflective surface over the first reflective surface, the second reflective surface movable with respect to the first reflective surface; and
a support structure configured to at least partially support the second reflective surface, the support structure comprising an optical element, wherein the optical element is disposed off-center from the support pest-structure.

29. An interferometric modulator array comprising:
a first reflective surface over a substrate;
a plurality of second reflective surfaces over the first reflective surface, each of the second reflective surfaces movable with respect to the first reflective surface; and
a plurality of support structures each configured to at least partially support the second reflective surfaces, wherein at least some of the plurality of support structures comprise an optical element,
wherein the optical element is disposed at a height between the first reflective surface and at least one of the plurality of second reflective surfaces.

30. The interferometric modulator of claim 29, wherein the optical element comprises a lens.

31. The interferometric modulator of claim 29, wherein the optical element comprises a prism.

32. The interferometric modulator of claim 29, wherein the optical element comprises a reflector.

33. The interferometric modulator of claim 29, wherein the optical element comprises an etalon.

34. An interferometric modulator array comprising:
a first reflective surface over a substrate;
a plurality of second reflective surfaces over the first reflective surface, each of the second reflective surfaces movable with respect to the first reflective surface; and
a plurality of support structures configured to at least partially support the second reflective surfaces, wherein at least some of the plurality of support structures each comprise an optical element, wherein some of the optical elements are different from others of the optical elements.

35. The interferometric modulator array of claim 34, wherein heights of the some of the optical elements are different from heights of the other of the optical elements.

36. An interferometric modulator array comprising:
a first reflective surface over a substrate;
a plurality of second reflective surfaces over the first reflective surface, each of the second reflective surfaces movable with respect to the first reflective surface; and
a plurality of support structures configured to at least partially support the second reflective surfaces, wherein at least some of the plurality of support structures each comprise an optical element,
wherein some of the optical elements comprise an etalon.

37. An interferometric modulator comprising:
a substrate;
a first reflective surface over the substrate, the first reflective surface being at least partially reflective and at least partially transparent to light;
a second reflective surface over the first reflective surface, the second reflective surface movable with respect to the first reflective surface; and
a support structure configured to at least partially support the second reflective surface, the support structure comprising an optical element, wherein the optical element comprises a light diffracting element, a scattering element, a total internal reflecting element, or a refractive element.

38. The interferometric modulator of claim 37, wherein the optical element comprises a light diffracting element.

39. The interferometric modulator of claim 37, wherein the optical element comprises a scattering element.

40. The interferometric modulator of claim 37, wherein the optical element comprises a total internal reflecting element.

41. The interferometric modulator of claim 37, wherein the optical element comprises a refractive element.

42. An interferometric modulator comprising:
a substrate;
a first reflective surface over the substrate, the first reflective surface being at least partially reflective and at least partially transparent to light;
a second reflective surface over the first reflective surface, the second reflective surface movable with respect to the first reflective surface; and
a support structure configured to at least partially support the second reflective surface, the support structure comprising an optical element, wherein the optical element is disposed above the first reflective surface.

43. The interferometric modulator of claim 42, wherein the interferometric modulator comprises a reflective modulator.

44. The interferometric modulator of claim 42, wherein the interferometric modulator comprises a MEMS interferometric modulator.

45. An interferometric modulator comprising:
a substrate;
a first reflective surface over the substrate, the first reflective surface being at least partially reflective and at least partially transparent to light;
a second reflective surface over the first reflective surface, the second reflective surface movable with respect to the first reflective surface; and
a support structure configured to at least partially support the second reflective surface, the support structure comprising an optical element,
wherein the optical element comprises an etalon.

* * * * *